Patented May 3, 1938

2,116,061

UNITED STATES PATENT OFFICE 2,116,061

PURIFICATION OF MINERAL OILS, TARS, THEIR DISTILLATION PRODUCTS, AND THE LIKE

Eugen Dorrer, Ludwigshafen-on-the-Rhine, Germany, assignor to Standard-I. G. Company, Linden, N. J., a corporation of Delaware No Drawing. Application October 21, 1930, Serial No. 490,334. In Germany October 26, 1929

1 Claim. (Cl. 196—36)

This invention relates to improvements in the purification of mineral oils, tars, their distillation products and the like.

It is known that the refining of crude hydrocarbons such as mineral oils, tars, synthetic oils, as well as their distillation products, as for example, crude benzol and the like may be effected by the action of concentrated sulphuric acid. This manner of working, however, has the objection that a great loss of the products to be purified (up to 10 per cent and higher) takes place. In order to meet this objection it has already been proposed to subject the said materials to a purification by treatment with hydrogen at elevated temperatures in the presence of catalysts which are immune from poisoning and especially those which are immune from poisoning by sulphur. When carrying out this process, especially when working on an industrial scale, there is, however, often the objection that certain substances of high molecular weight or substances which tend to resinify or decompose under the reaction conditions, prematurely reduce the activity of the catalysts, as for example, by clogging the pores and cause deposits in the preheaters and vaporizers. The amounts of these injurious substances are generally speaking small and in all cases are much smaller than the amount of the unsaturated or resinous constituents, which are removed when treating the said hydrocarbons with concentrated sulphuric acid in the known manner, whereby the aforementioned great losses by refinery take place.

I have now found that the aforementioned objections are obviated by carrying out the purification in several stages, in such a manner that in the first stage the said substances which resinify or decompose when heated to temperatures up to about 400° C. in the presence of hydrogen and which cause the aforesaid reduction of the activity of the catalyst, are first partly or wholly removed, substantially without the removal of other constituents, by polymerization or adsorption or decomposition; the products which have thus been pretreated are then treated in a further stage with hydrogen at elevated temperatures while avoiding splitting of the carbon bonds in the hydrocarbon molecules in the presence of catalysts which are immune from poisoning by sulphur, if desired, under pressure. In many cases even a mild treatment in the first stage is sufficient to avoid the difficulties occurring in the catalytic treatment.

The removal in the first stage of the process of the said impurities, which injure the catalysts may be effected by treating the initial material at moderate temperatures (not higher than 100° C.), preferably while stirring, with a mildly reactive acid, namely a dilute acid (as for example 40 per cent sulphuric acid or by a weak acid, as for example small amounts of an organic acid, such as acetic acid, oxalic acid or malonic acid). Instead of the acid it is possible to employ small amounts of catalysts facilitating polymerization, such as small amounts of sulphur, potassium hydrosulphide, zinc chloride or aluminium chloride. The removal may also be effected by heating the initial materials at temperatures at which they are fluid, for example, from about 250° to 400° C. and preferably at 350° C., and at ordinary or elevated pressure with bleaching earth or other substances having a large superficial area, such as silica gel, pumice stone, bauxite and the like. This treatment may be carried out in the liquid or vaporous phase. When working in the vaporous phase, also extraneous gases, as for example, hydrogen, water vapour or small amounts of air and the like may be added. When employing high boiling materials, it is preferable to dilute them with middle oils, the middle oils being distilled off after the pretreatment or at the end of the process. The duration of the treatment is dependent on the nature of the materials under treatment and on the nature of the impurities to be removed.

It is an essential feature of the present invention to remove the substances which have a very strong tendency to polymerization, only to such an extent that the initial materials are rendered innocuous to the catalysts employed in the second stage of the process. Thus it is not intended to remove those acid or basic substances or the compounds of sulphur or oxygen or nitrogen or unsaturated compounds which have no injurious effect in the second stage. The removal of these substances as far as they are impurities is only effected in the second stage, i. e. the catalytic treatment with hydrogen.

If necessary, the materials may repeatedly be subjected to one of the said first stage processes, or they may successively be subjected to different first stage treatments.

The materials are then treated in a further stage with hydrogen at elevated temperature in the presence of catalysts which are immune from poisoning. The treatment with hydrogen in the further stage hereinbefore referred to may, for example, be carried out under ordinary or increased pressure and at temperatures above about 200° C. and usually up to about 450° C. but preferably not above 350° C. with catalysts, preferably deposited or precipitated on or applied to carriers, which catalysts contain the solid oxides or sulphides of the metals of the second to the seventh groups, preferably of the sixth group of the periodic system or compounds of these metals supplying the said oxides or sulphides, or mixtures thereof, and preferably in conjunction with metals of the eighth group or with heavy metals of the first or second group of the periodic system, namely copper, silver or gold, zinc or cadmium, or compounds thereof, consisting of or supplying oxides or sulphides or metals or mixtures of the same. By the treatment with hydrogen in this stage the unsaturated hydrocarbons are saturated with hydrogen. In addition thereto the compounds containing sulphur or oxygen or nitrogen or halogen are removed from the materials by the conversion of the same into hydrocarbons and sulphuretted hydrogen, water, ammonia, or hydrogen halides.

The sulphur compounds can usually be removed with the least difficulty, whereas the difficulty as a general rule increases in the following order: compounds of sulphur, compounds of oxygen, halogen compounds and nitrogen compounds and the duration of the treatment must be correspondingly increased. The duration of the treatment may usually be decreased as the pressure of the hydrogenating gas is increased. Also the greater the activity of the catalyst employed, the shorter will be the duration of the treatment.

The aforementioned catalysts may be mixed in any desired proportions, but usually molecular proportions have been found to be most advantageous. Such catalytic mixtures are, for example, cobalt and tungsten; iron and molybdenum; cobalt, molybdenum and copper; nickel and chromium; iron and calcium; nickel and arsenic; cobalt and antimony; zinc and molybdenum; nickel and tin; cadmium, iron and antimony; nickel and molybdenum; iron and tungsten; tin and lead; cobalt and molybdenum; aluminium, chromium and nickel; platinum and tungsten; palladium and chromium; osmium and arsenic; osmium and molybdenum; cobalt and antimony; cobalt and calcium; cobalt, nickel and chromium; chromium, zinc and molybdenum; copper, tungsten and tin; osmium, platinum and tin; nickel and antimony; silver, nickel and molybdenum; silver and molybdenum; tungsten, molybdenum and silver; cobalt and chromium; cadmium, molybdenum and nickel; molybdenum and chromium. As typical examples of carriers to which the said catalysts may be applied or on which they may be deposited may be mentioned active charcoal, fuller's earth, Florida earth, diatomaceous earth, silica gel, alumina gel, pumice stone, bauxite, burnt fire-clay and the like.

Usually pressures ranging between 1 atmosphere and 100 atmospheres may be employed, but in some cases higher pressures, for example, 150, 200 or even 1000 atmospheres may be employed.

The products may, if required, be subjected to a washing or purification of the usual kind as for example with dilute acid or aqueous alkali in order to remove the last traces of any ammonia or hydrogen sulphide and the like formed and dissolved therein.

The following examples will further illustrate the nature of this invention, but the invention is not restricted to these examples.

*Example 1*

A preliminary product from the recovery of benzol which has been obtained by blowing a washing oil with steam and which gives a purification loss of 10 per cent by treatment with concentrated sulphuric acid, causes deposits of resinous and coaly substances, which in all amounts to about 0.5 per cent of the throughput, in the vaporizer and preheater during the preheating to 300° C. as well as on the catalyst in the subsequent catalytic purification by treatment at normal pressure with hydrogen in the presence of a catalyst immune to poisoning, prepared from nickel oxide and tungsten oxide on active carbon.

If however this crude benzol be led at 250° C. in the presence of about 15 per cent of hydrogen over Florida earth in the vaporous phase at ordinary pressure before the catalytic treatment, the said objection during the heating to 300° C. no longer takes place; moreover, the catalyst retains the same activity for a very long period of time. In the preliminary purification at 250° C. with Florida earth the hydrogen may be replaced by small amounts, as for example, 2 per cent of air.

The bleaching earth employed may be completely regenerated again when exhausted by oxidation with air.

*Example 2*

A solvent benzol having a boiling point of from 140° to 200° C. and a density of 0.880 at 20° C. and which gives a washing loss of 35 per cent when washed with concentrated sulphuric acid, is pumped at 250° C. under a hydrogen pressure of 200 atmospheres through a high pressure vessel which is charged with bleaching earth. The loss caused by the resinified substances amounts to about 1 to 1.5 per cent calculated on the initial material. The subsequent treatment at 350° C. with hydrogen under a total pressure of 200 atmospheres in the presence of a catalyst immune to poisoning consisting of nickel sulphide and chromium oxide on fuller's earth as a carrier yields a purified solvent benzol having the same boiling point and a density of 0.872 at 20° C. which is only slightly colored yellow by sulphuric acid. The treatment proceeds without trouble.

If the preliminary purification be omitted, the activity of the purification catalyst commences to subside even after operation for only a short period of time and, moreover, marked resinification and coking takes place in the preheaters and conduit pipes.

The bleaching earth employed may be readily regenerated by oxidation with air.

*Example 3*

A mineral coal tar middle oil having a boiling point of from 200° to 350° C. and a density of 1.10 at 20° C. is washed with 40 per cent sulphuric acid and distilled off from the polymerization products formed. The resulting product is led in the liquid phase together with hydrogen under a pressure of 200 atmospheres and at a temperature of 350° C. over a catalyst of cobalt sulphide and molybdenum sulphide with or without zinc oxide on Florida earth.

A product free from phenol having a boiling point of from 120° to 170° C. and a density of 0.840 at 20° C. is obtained, the treatment proceeding in a manner free from objection.

The catalyst retains its activity unchanged for a long period of time. Without the preliminary purification the activity of the catalyst very rapidly subsides.

Instead of the sulphuric acid 1 per cent of aluminium chloride may also be used. In this case it is necessary to remove the aluminium chloride by washing the products with water, the hydrocarbon product being then freed from the resinified substances by distillation.

What I claim is:—

A process for refining a crude aromatic hydrocarbon mixture, which comprises contacting said crude hydrocarbon in the vaporous phase at an elevated temperature with the surface of a solid substance having a large superficial area and with hydrogen while regulating the conditions so as to effect the removal of substances which resinify or decompose, when heated up to 400° C. in the presence of hydrogen, substantially without the removal of other constituents, and then treating the resulting main product with hydrogen at elevated temperatures between 200° and 350° C. while avoiding splitting of the carbon bonds in the hydrocarbon molecules in the presence of a catalyst which is immune from poisoning by sulphur.

EUGEN DORRER.